(12) United States Patent
Miura et al.

(10) Patent No.: US 11,880,070 B2
(45) Date of Patent: Jan. 23, 2024

(54) OPTICAL CIRCUIT FOR ALIGNMENT

(71) Applicant: Nippon Telegraph and Telephone Corporation, Tokyo (JP)

(72) Inventors: Toru Miura, Tokyo (JP); Yoshiho Maeda, Tokyo (JP); Hiroshi Fukuda, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 505 days.

(21) Appl. No.: 15/734,509

(22) PCT Filed: May 17, 2019

(86) PCT No.: PCT/JP2019/019736
§ 371 (c)(1),
(2) Date: Dec. 2, 2020

(87) PCT Pub. No.: WO2019/235182
PCT Pub. Date: Dec. 12, 2019

(65) Prior Publication Data
US 2021/0231878 A1    Jul. 29, 2021

(30) Foreign Application Priority Data
Jun. 5, 2018  (JP) ................ 2018-107634

(51) Int. Cl.
*G02B 6/34*  (2006.01)
*G02B 5/18*  (2006.01)
*G02B 6/30*  (2006.01)

(52) U.S. Cl.
CPC ............. *G02B 6/34* (2013.01); *G02B 5/1809* (2013.01); *G02B 5/1819* (2013.01); *G02B 6/30* (2013.01)

(58) Field of Classification Search
CPC ... G02B 6/26; G02B 6/30; G02B 6/34; G02B 6/305; G02B 6/124; C08K 5/12
See application file for complete search history.

(56) References Cited

U.S. PATENT DOCUMENTS 10,088,299 B2    10/2018  Tokushima
2015/0050020 A1*  2/2015  Tanaka ................ H04B 10/564
                                                     398/79
(Continued)

FOREIGN PATENT DOCUMENTS

JP    2010122590 A    6/2010
JP    2016148717 A    8/2016
(Continued)

OTHER PUBLICATIONS

Coster et al., "Test-station for flexible semi-automatic wafer-level silicon photonics testing," 21st IEEE European Test Symposium (ETS), 2016, 6 pages.
(Continued)

*Primary Examiner* — Michael P Mooney
(74) *Attorney, Agent, or Firm* — Slater Matsil, LLP

(57) ABSTRACT

Plural grating couplers having grating conditions different from each other and plural optical waveguides respectively connected with the plural grating couplers are included. The plural grating couplers have the same arraying directions of gratings. Further, each of the plural grating couplers has a different grating interval as a grating condition. Further, plural reflection units respectively provided to the plural optical waveguides are included.

12 Claims, 5 Drawing Sheets

(56) References Cited

U.S. PATENT DOCUMENTS

2015/0355421 A1* 12/2015 Li .................... G02B 6/4225
                                                      250/227.14
2017/0108375 A1*  4/2017 Brueck ............... G02B 6/124
2018/0010906 A1*  1/2018 Tokushima ........... G01B 11/14

FOREIGN PATENT DOCUMENTS

| JP | 2017520764 A | 7/2017 |
| JP | 2018005067 A | 1/2018 |
| WO | 2018037700 A | 3/2018 |

OTHER PUBLICATIONS

Li et al., "CMOS-compatible high efficiency double-etched apodized waveguide grating coupler," Institute of Microelectronics, Optics Express vol. 21, No. 7, Apr. 8, 2013, pp. 7868-7874.

* cited by examiner

OPTICAL CIRCUIT FOR ALIGNMENT

CROSS-REFERENCE TO RELATED APPLICATIONS

This application is a national phase entry of PCT Application No. PCT/JP2019/019736, filed on May 17, 2019, which claims priority to Japanese Application No. 2018-107634, filed on Jun. 5, 2018, which applications are hereby incorporated herein by reference.

TECHNICAL FIELD

The present invention relates to an alignment optical circuit used for optical connection between a grating coupler and an optical fiber.

BACKGROUND

A spot size converter, a spherical lensed fiber, and so forth have been used so far for optically connecting a silicon optical circuit with an optical fiber (optical connection) in order to improve efficiency of optical connection between a waveguide end surface and the optical fiber. In recent years, because of progress in micromachining techniques, many examples have been seen where a grating formed with a groove with a width of several hundred nm is provided to the silicon waveguide, gratings are caused to function as a grating coupler radiating light upward and downward from an optical waveguide to a substrate surface, and optical connection with the optical fiber is performed.

For example, in silicon photonics, a technique has been suggested which uses a grating coupler for optical connection with an optical fiber (see Non-Patent Literature 1). In this technique, a light emission angle of light from the grating coupler to an upper surface is an angle satisfying formula (1) described on p. 7,870 of Non-Patent Literature 1 and is set to an inclination angle within 20 deg. from a vertical direction to a substrate.

In a case where light is coupled with a grating coupler, a single mode fiber (SMF), a fiber array, or the like is used. In the following, a case of an SMF 303 will be described as an example with reference to FIG. 7. In this example, a grating coupler 302 is provided to an optical waveguide 301 formed on a substrate 300. In order to optically couple the SMF 303 with the grating coupler 302, alignment in a plane (XY plane) parallel with the plane of the substrate 300, alignment for angular directions Ox, Oy, and Oz decided by a parameter such as a grating interval (pitch), and alignment for a distance Z between the grating coupler 302 and the SMF 303 are necessary.

In order to perform such alignment, in general, a sample circuit for alignment (alignment optical circuit) is first prepared, and alignment is performed by using the prepared sample circuit. Next, an optical fiber is moved to a desired optical circuit by using a stepping motor or the like such that the relative positional relationship, set by the alignment, between the optical fiber and the sample circuit is established, and optical connection between the optical fiber and an optical circuit is performed in this state. In this state, for example, predetermined measurement in the optical circuit is performed (see Non-Patent Literature 2).

CITATION LIST

Non-Patent Literature

Non-Patent Literature 1: C. Li et al., "CMOS-compatible high efficiency double-etched apodized waveguide grating coupler", Optics Express, vol. 21, no. 7, pp. 7868-7874, 2013.

Non-Patent Literature 2: J. D. Coster et al., "Test-station for flexible semi-automatic wafer-level silicon photonics testing", 21st IEEE European Test Symposium, pp. 23-27, 2016.

SUMMARY

Technical Problem

As described above, in a case where light is coupled with a grating coupler, alignment with an optical fiber is necessary. Adjustment of six axes is necessary for correct coupling, and correct optical coupling may not be achieved even if only one axis of those is out of alignment. Here, an emission angle of the grating coupler is largely dependent on a grating pitch, for example. Further, an interval of the grating changes due to a manufacturing error or the like. Thus, the optimal coupling angle θx changes for each alignment target. Further, a deviation also occurs to a coupling angle θz due to an error or the like in an installation state of a substrate on which an optical circuit is formed or a fixed position of the optical fiber. As described above, related art has a problem that alignment for obtaining optical connection between the optical fiber and the grating coupler is not easily conducted.

Embodiments of the present invention have been made for solving the above problem, and one object thereof is to enable alignment for obtaining optical connection between an optical fiber and a grating coupler to be easily conducted.

Means for Solving the Problem

An alignment optical circuit according to embodiments of the present invention includes: plural grating couplers being formed on a substrate and having grating conditions different from each other; plural optical waveguides being respectively connected with the plural grating couplers; and plural reflection units being respectively provided to the plural optical waveguides.

In the above alignment optical circuit, the plural grating couplers have same arraying directions of gratings, and each of the plural grating couplers has a respective different grating interval as a grating condition.

In the above alignment optical circuit, a size relationship between the grating intervals of the plural grating couplers and a grating interval of a grating coupler as an alignment target may be known. Further, differences between the grating intervals of the plural grating couplers and a grating interval of a grating coupler as an alignment target may be known.

In the above alignment optical circuit, the grating interval of any one of the plural grating couplers may be set same as a grating interval of a grating coupler as an alignment target.

In the above alignment optical circuit, the plural grating couplers may have arraying directions of gratings, the arraying directions being set to different directions from each other, as a grating condition.

Effects of Embodiments of the Invention

As described above, in embodiments of the present invention, plural grating couplers having different grating conditions from each other are prepared, and an excellent effect may thus be obtained in which alignment for obtaining optical connection between an optical fiber and the grating coupler may be conducted easily.

DETAILED DESCRIPTION OF ILLUSTRATIVE EMBODIMENTS

Figure 1:
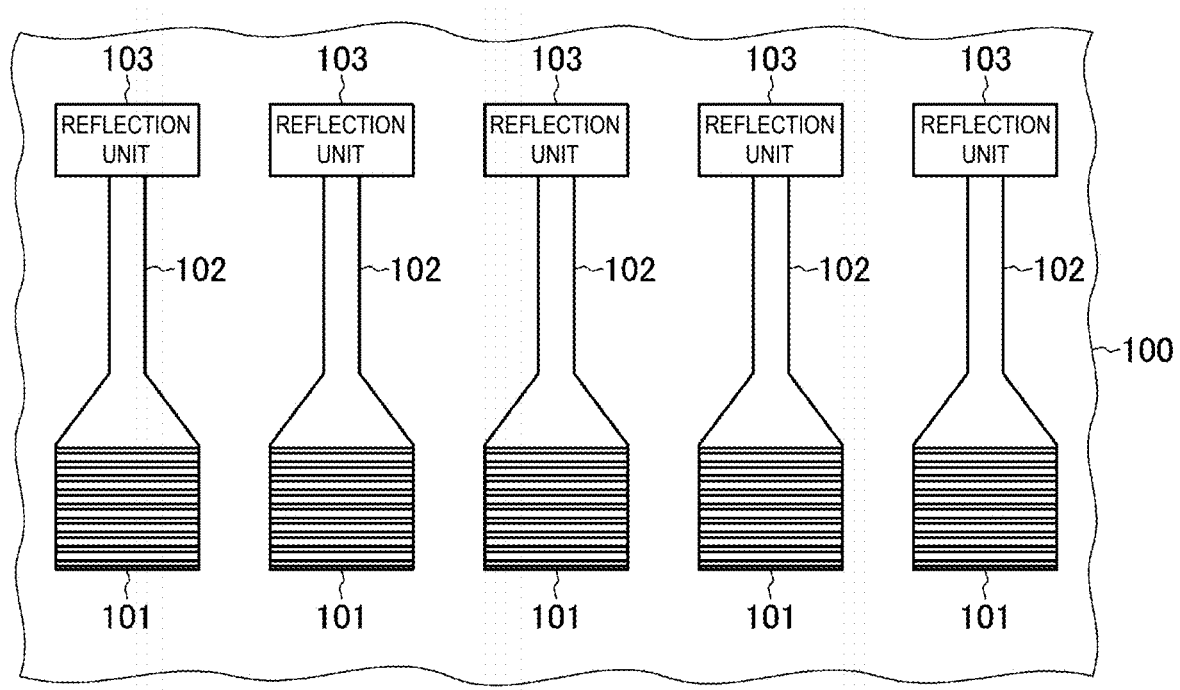
FIG. 1 is a plan view that illustrates a configuration of an alignment optical circuit in an embodiment of the present invention.

An alignment optical circuit in an embodiment of the present invention will hereinafter be described with reference to FIG. 1. This alignment optical circuit includes plural grating couplers 101 having grating conditions different from each other and plural optical waveguides 102 respectively connected with the plural grating couplers 101. In the example illustrated in FIG. 1, the plural grating couplers 101 have the same arraying directions of gratings. Further, each of the plural grating couplers 101 has a different grating interval as a grating condition.

Further, this alignment optical circuit includes plural reflection units 103 respectively provided to the plural optical waveguides 102. The reflection unit 103 may be configured with a reflection mirror such as a distributed Bragg reflector (DBR) or a loop mirror, for example. Light incident from an optical fiber (not illustrated) to be aligned via the grating coupler 101 is again returned to the grating coupler 101 by the reflection unit 103 and is coupled with the optical fiber.

Here, the size relationship between the grating intervals of the plural grating couplers 101 and the grating interval of a grating coupler as an alignment target is known. Further, the differences between the grating intervals of the plural grating couplers 101 and the grating interval of the grating coupler as the alignment target may be known. In particular, the grating interval of any one of the plural grating couplers 101 is desirably set the same as the grating interval of the grating coupler as the alignment target.

Figure 2:
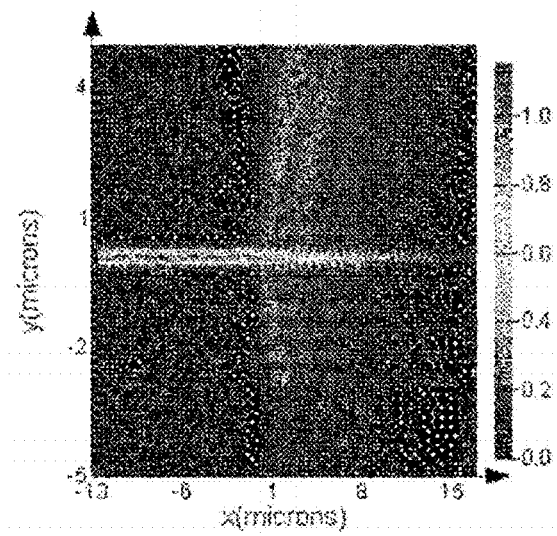
FIG. 2 is a distribution diagram that is obtained by a calculation model of a grating coupler 101 and illustrates an electric field distribution of light emitted from the grating coupler 101.

The above-described configuration of one set of the grating coupler 101, the optical waveguide 102, and the reflection unit 103 is the simplest alignment circuit. Accordingly, alignment may be conducted by searching for the position and angle at which the light returns to the optical fiber most intensively. FIG. 2 illustrates the electric field distribution of light emitted from the grating coupler 101 by a basic calculation model of the grating coupler 101.

Figure 3:
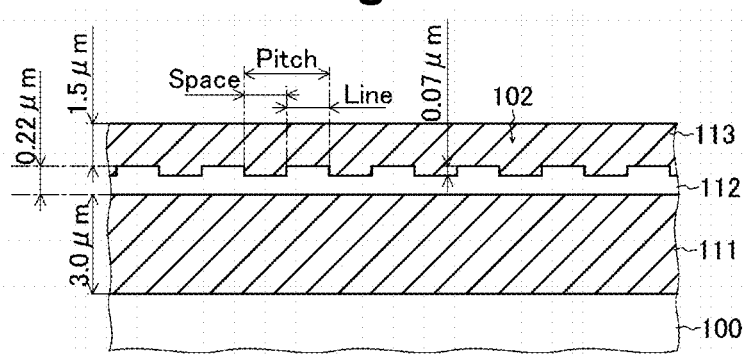
FIG. 3 is a cross-sectional view that illustrates a partial configuration of the alignment optical circuit in the embodiment of the present invention.

As illustrated in FIG. 3, a layer structure used for calculation includes a lower clad layer 111 formed on the substrate 100, a core 112 formed on the lower clad layer 111, and an upper clad layer 113 formed on the lower clad layer 111 to cover the core 112. Further, gratings are formed on an upper surface of the core 112 and serve as the grating coupler 101. Note that in a region not illustrated in FIG. 3, the optical waveguide 102 is configured with the core 112 in which no grating is formed.

The above-described configuration may be formed by using a well-known SOI (Silicon on Insulator) substrate, for example. The lower clad layer 111 is configured with an embedded insulator ($SiO_2$) layer, with a thickness of approximately 3 μm, of the SOI substrate, patterning with a surface silicon layer with a thickness of approximately 0.22 μm is performed, and the core 112, gratings, and so forth are thereby configured. The grating has a depth of 70 nm, an interval of 630 nm, and a fill factor of 50%. Further, the upper clad layer 113 may be formed by depositing silicon oxide and have a thickness of approximately 1.5 urn.

As illustrated in FIG. 2, light is emitted at an angle from the grating coupler and is emitted while being inclined at an angle of about 15 deg. from a perpendicular line with respect to a substrate surface. Alignment for six axes is performed for the light emitted obliquely in such a manner.

Figure 4:
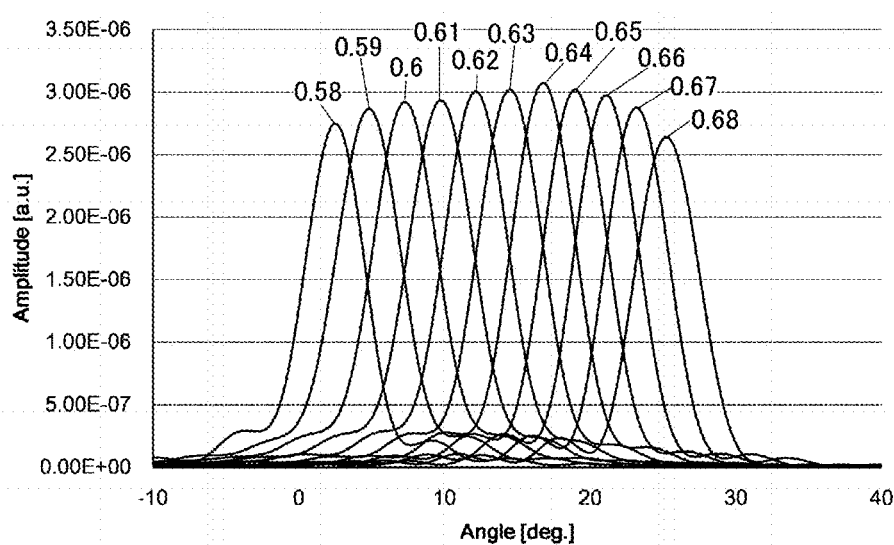
FIG. 4 is a characteristic diagram that represents calculation results of emission angles in a case where an interval (pitch) of gratings of the grating coupler 101 is changed.

FIG. 4 represents calculation results of emission angles in a case where the interval (pitch) of the gratings of the above-described grating coupler 101 is changed. FIG. 4 represents emission angle distribution at each pitch in a case where the pitch is changed in a range of ±50 nm with 630 nm being the center. The angles here are angles from a perpendicular line with respect to the plane of the substrate 100. As it is understood from FIG. 4, the emission angle becomes larger as the pitch becomes longer.

Figure 5:
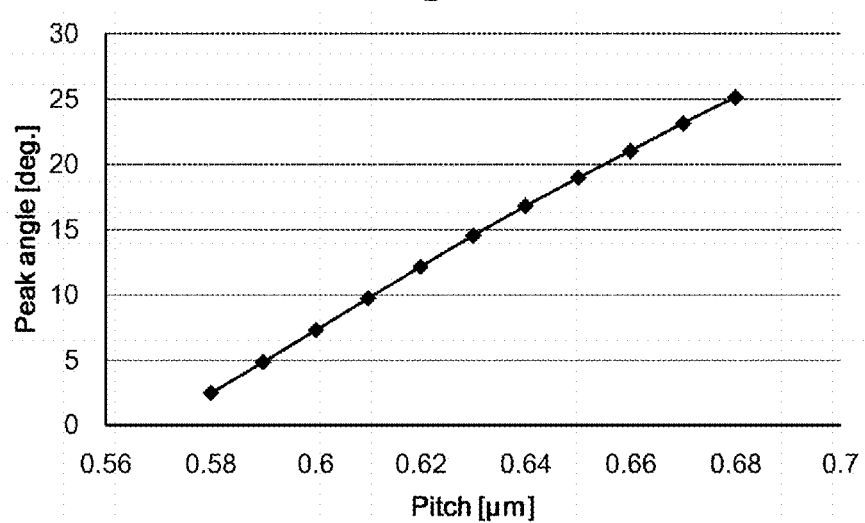
FIG. 5 is a characteristic diagram that represents the relationship between the pitch and a peak angle of emission.

FIG. 5 is a diagram in which the relationship between the pitch and a peak angle of emission is plotted. It may be understood that the pitch and the peak angle are in an almost linear relationship and the peak angle has pitch dependency of about 0.23 deg./nm. This pitch dependency enables a grating with a desired emission angle to be designed. In an actually fabricated grating coupler 101, the pitch changes due to a manufacturing error, and the emission angle changes.

Thus, the plural grating couplers 101 are prepared as alignment optical circuits of Ox between the grating coupler 101 and the optical fiber, and it is assumed that each of the plural grating couplers 101 has a different grating pitch. For example, in the plural grating couplers 101, only the pitches in the up-down direction on the page of FIG. 1 change. For each of the plural grating couplers 101 configured in such a manner, coupling with the optical fiber is measured in a state where θx is fixed to a predetermined value. As a result of this measurement, it may be assessed whether the set (fixed) θx of the optical fiber is large or small compared to the emission angle of the grating coupler with a desired pitch, and the alignment direction of θx of the optical fiber may be decided based on the result.

FIG. 1 illustrates an example where five grating couplers 101 having the same arraying direction of gratings are arranged. For example, it is first assumed that the grating coupler 101 in the central portion has the same grating pitch as an actual grating coupler as an alignment target. Further, it is assumed that the grating couplers 101 on the right of that have larger pitches than an actual pitch and the grating couplers 101 on the left side have larger pitches than the actual pitch. Such a configuration facilitates the above-described assessment.

Incidentally, in a case where the positional relationship between the optical fiber and the grating coupler in a Oz direction is out of alignment, the ratio of light coupled with the gratings decreases also. Further, a grating coupler basically has polarization dependency, and light only in a TE mode in which an electric field oscillates in a direction parallel with a groove direction of the grating is coupled with the grating coupler. Consequently, in a case where the positional relationship between the optical fiber and the grating coupler in the Oz direction is out of alignment, coupling loss becomes large because of addition of loss due to the polarization dependency. Consequently, a state where the Oz direction of the optical fiber is parallel with the Oz direction of the grating coupler is optimal as a coupling condition in the Oz direction.

Figure 6:
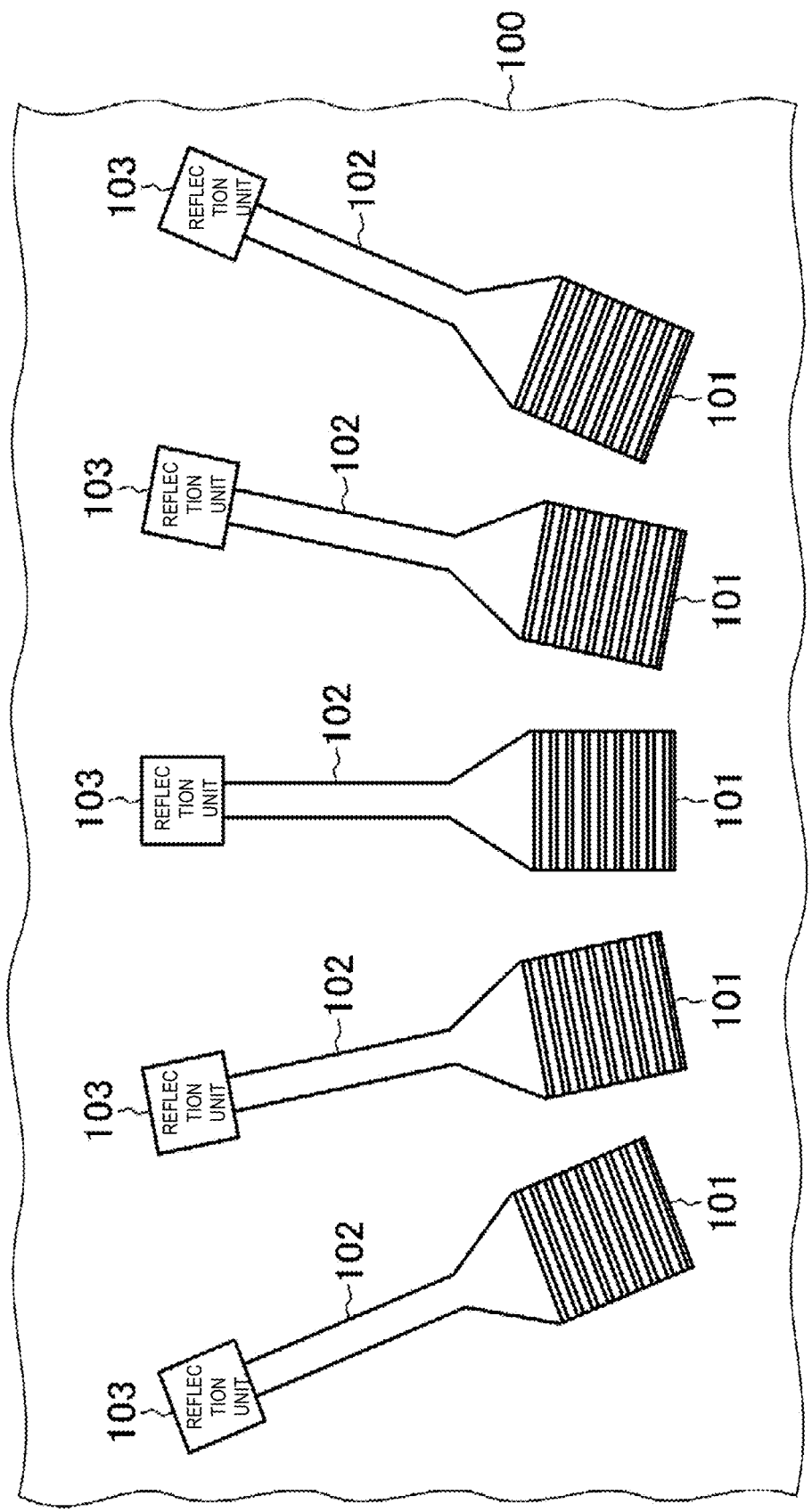
FIG. 6 is a plan view that illustrates a configuration of another alignment optical circuit in the embodiment of the present invention.
Figure 7:
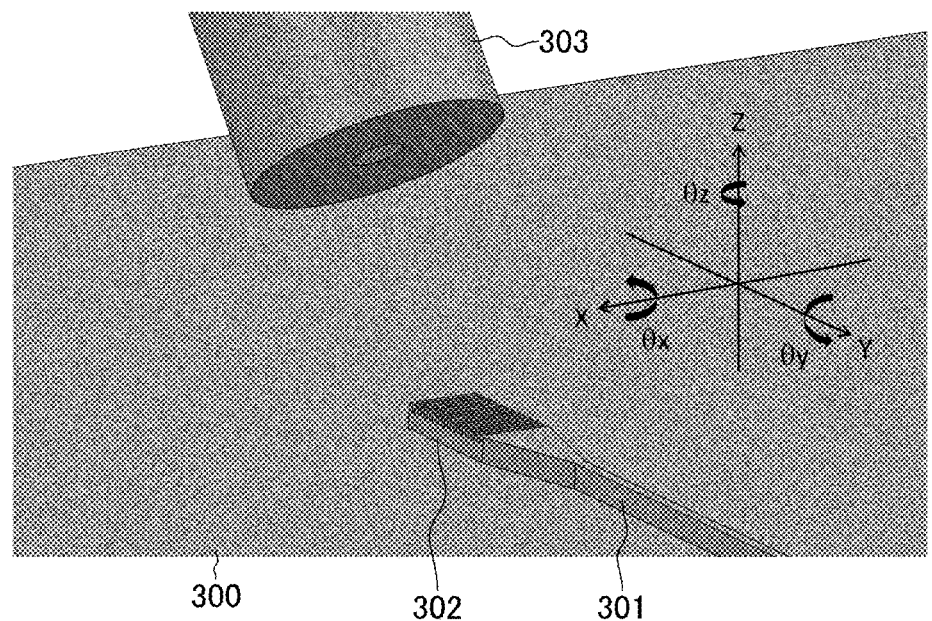
FIG. 7 is a perspective view that illustrates an alignment state of an SMF 303 with respect to a grating coupler 302.

In order to perform alignment in the Oz direction of the optical fiber, as illustrated in FIG. 6, the plural grating couplers 101 may be arranged such that the arraying directions of gratings are set to different directions from each other, as a grating condition. For example, the grating couplers 101 are produced which have plural angles and include the grating coupler 101 with the same angle (Oz direction) as the grating coupler as the alignment target, coupling with each of the grating couplers 101 is measured, and the alignment direction in the Oz direction of the optical fiber is thereby decided.

Specifically, by measuring coupling states with the grating couplers 101 at plural levels of the Oz direction, it may be known that Oz of the grating coupler 101 with the most intensive returning light is close to Oz of the optical fiber. Thus, because the angle of the optical fiber in the Oz direction may be known in accordance with the coupling with the grating coupler 101 at which level is most intensive, it may be determined in which direction alignment has to be performed. Note that the plural grating couplers 101 may have grating intervals different from each other. In such a configuration, as described above, the grating coupler 101 may be used for decision of the alignment direction in a θx direction.

As described above, the plural grating couplers having different grating conditions from each other are prepared on the substrate, and alignment for obtaining optical connection between the optical fiber and the grating coupler may thus be conducted easily. Plural levels of the alignment optical circuit are set for the grating interval responsive to a deviation in the Ox direction and for the angle in the Oz direction of the grating, the angle being responsive to a deviation in the Oz direction, and decision of the optimal level thereby becomes easy.

Note that the present invention is not limited to the embodiment described above, and it is clear that many modifications and combinations may be carried out by a person having ordinary skill in the art in the technical idea of the present invention. For example, the above description mainly targets an optical waveguide formed with a core formed of silicon; however, optical waveguides are not limited to this, but the same applies to optical waveguides formed with a core formed of another semiconductor.

REFERENCE SIGNS LIST 101 grating coupler
102 optical waveguide
103 reflection unit.

The invention claimed is:

1. An alignment optical circuit comprising:
plural grating couplers being on a substrate, each of the plural grating couplers having a respective grating condition different from other ones of the plural grating couplers wherein a grating interval of one of the plural grating couplers equals a grating interval of an alignment target, wherein the alignment target is a grating coupler, wherein each of the plural grating couplers has a respective grating arraying direction as the respective grating condition, the respective grating arraying direction being different from other ones of the plural grating couplers;
plural optical waveguides being respectively connected with the plural grating couplers; and
plural reflectors being respectively connected to the plural optical waveguides.

2. The alignment optical circuit according to claim 1, wherein:
each of the plural grating couplers has a grating interval different from other ones of the plural grating couplers.

3. The alignment optical circuit according to claim 2, wherein a size relationship between the respective grating interval of each of the plural grating couplers and a grating interval of an alignment target is preset, wherein the alignment target is one of the plural grating couplers.

4. The alignment optical circuit according to claim 2, wherein
differences between the respective grating interval of each of the plural grating couplers and a grating interval of an alignment target is preset, wherein the alignment target is a grating coupler.

5. The alignment optical circuit of claim 1, wherein each of the plural optical waveguides is a distributed Bragg reflector (DBR) or a loop mirror.

6. A method comprising:
disposing plural grating couplers on a substrate, each of the plural grating couplers has a grating interval as different from other ones of the plural grating couplers, wherein each of the plural grating couplers has a respective grating arraying direction, the respective grating arraying direction being different from other ones of the plural grating couplers, wherein a grating interval of one of the plural grating couplers equals a grating interval of an alignment target, wherein the alignment target is a grating coupler;
respectively connecting plural optical waveguides with the plural grating coupler; and
respectively connecting plural reflectors to the plural optical waveguides.

7. The method according to claim 6, wherein a size relationship between the respective grating interval of each of the plural grating couplers and a grating interval of an alignment target is preset, wherein the alignment target is a grating coupler.

8. The method according to claim 6, wherein differences between the respective grating interval of each of the plural grating couplers and a grating interval of an alignment target is preset, wherein the alignment target is a grating coupler.

9. The method according to claim 6, wherein each of the plural optical waveguides is a distributed Bragg reflector (DBR) or a loop mirror.

10. The method according to claim 6, further comprising:
aligning an optical fiber in six axes with the plural grating couplers.

11. The method according to claim 6, wherein the grating arraying directions of the plural grating couplers are arranged around a Z axis, the Z axis being perpendicular to a major surface of the substrate.

12. The method according to claim 11, wherein an angular direction Oz is an angle around the Z axis, wherein each of the grating arraying directions of the plural grating couplers is at a different angle of the angular direction θz.

* * * * *